March 19, 1957     G. R. ASHLEY     2,785,500
FISHHOOK RECOILER FROM OBSTACLES
Filed May 6 1954
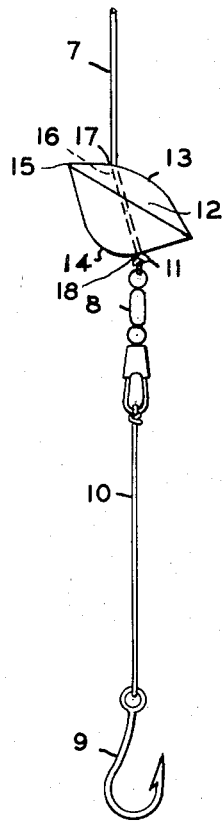
FIGURE 1.
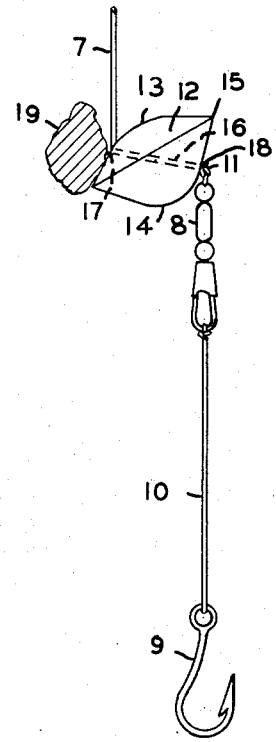
FIGURE 2.
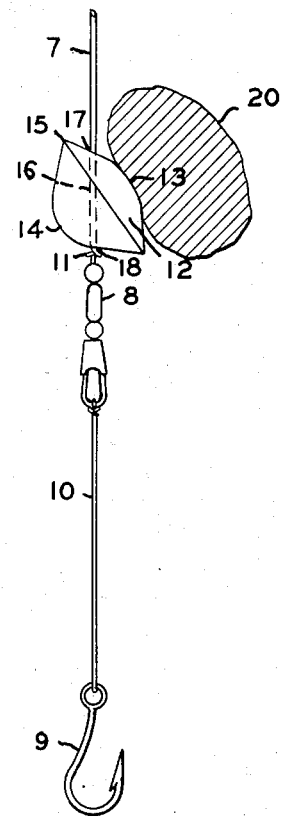
FIGURE 3.
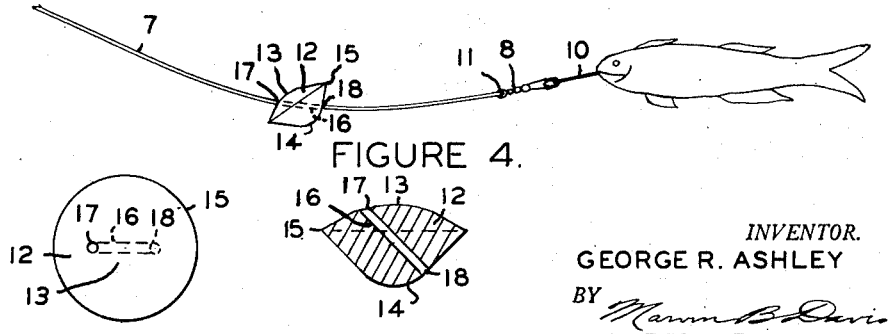
FIGURE 4.
FIGURE 5.     FIGURE 6.
*INVENTOR.*
GEORGE R. ASHLEY
BY
ATTORNEY United States Patent Office 2,785,500
Patented Mar. 19, 1957

2,785,500
FISHHOOK RECOILER FROM OBSTACLES

George R. Ashley, Kansas City, Mo.

Application May 6, 1954, Serial No. 428,054

1 Claim. (Cl. 43—44.97)

This invention relates to a fishhook recoiler adapted to bounce off an obstacle and carry a fish-line and hook with it when casting a fishing line.

An object of the present invention is to provide a weight means for a fishing line that will cause the line with a hook to clear an obstacle under the water before the hook can snag on the obstacle while a fisherman normally casts a line.

Another object of this invention is to provide a recoiler with deflecting surfaces and comprising a weight having a vertical axis, the weight being formed with a hole passing therethrough in angular relation to said axis for sliding on a fishing line to a stop member spaced above the hook whereby the weight may strike an object when in its path and a pull on the fish-line will cause the weight to partially revolve and deflect the hook and line below the weight away from an obstacle.

With these objects in view the invention will be more fully understood from the drawing, the specification and the appended claim.

In the drawings:

Figure 1 is an elevational view of the fishhook recoiler positioned on a casting line next to a stop member spaced above the hook.

Figure 2 is a view similar to Figure 1 showing the fishhook recoiler having it's leading edge encountering an obstacle and partially rotated by the offset line above the weight in respect to the opposed offset line below the weight.

Figure 3 is a view similar to Figure 1 with the recoiler striking an obstacle so as to bounce away from the obstacle and carry the hook and line with it.

Figure 4 is a view illustrating a fish on a line with the recoiler sliding on the line according to the position of the fish in the water.

Figure 5 is a plan view of the recoiler.

Figure 6 is a central sectional view of the recoiler of Figure 5.

The fish-line 7, sinker 8, hook 9, hook line 10, and knot 11 are all well known in the prior art and need no further description.

The fishhook recoiler 12 as viewed in Figure 6 is a weight having an upper shallow convex surface 13 and a lower deep convex surface 14 with the surfaces thereof merging into a knife like edge 15 preferably circular in form, thus spacing the center of gravity of the weight below the knife like edge 15.

A hole 16 having its longitudinal axis is arranged at an angle with respect to the vertical axis of the weight or fishhook recoiler 12 is provided with an upper opening 17 offset and to one side of the vertical axis of the weight and with a lower opening 18 offset on the opposite side of the vertical axis of the weight.

The normal position of the recoiler 12 on the fish-line 7 when being pulled through the water is illustrated in Figure 1. The fishhook recoiler may slide on the line 7 until the lower opening 18 rests against the knot 11 spaced from the hook 9 by a sinker 8, and a line 10. The line 7 extends through the upper opening 17 which is offset from the vertical axis and causes the recoiler 12 to tilt on its center of gravity by being extended through lower opening 18 on the opposite side of the center of gravity. The leading portion of knife like edge 15 is vulnerable to catch on an obstacle 19 and cause the recoiler 12 to rotate or turn as illustrated in Figure 2 and force the sinker 8, hook 9, and line 10 to move further away from the object. This rotating or turning action of the recoiler 12 causes an outward movement from the obstacle 19.

If the upper convex surface 13 strikes an obstacle 20 as illustrated in Figure 3 the weight will bounce off the obstacle away from the obstacle thus clearing the hook 9 therefrom.

This fishbook recoiler passes through thick brush and clears the passage for the hook in most cases when used on a casting line.

What I claim as new and desire to secure by Letters Patent is:

A recoiler mounted on a line having means adapted to space the recoiler above a snelled fishhook so as to enable the hook to be moved away from an underwater obstruction, the recoiler comprising: a weight, said weight having a knife like edge, said weight being substantially disc shaped and having a relatively thinner upper portion and a much thicker lower portion about said knife like edge around the periphery of the disc, and said weight having a hole extended through the thinner upper portion of the weight and the thicker lower portion of the weight with the upper opening of the hole being closer to one portion of the knife like edge of the disc and the lower opening of the hole being closer to the diametrically opposite portion of the knife like edge of the disc.

References Cited in the file of this patent

UNITED STATES PATENTS

| D. 169,326 | Patrick | Apr. 14, 1953 |
| 1,002,981 | Ford | Sept. 12, 1911 |
| 1,390,458 | Moree | Sept. 13, 1921 |
| 1,678,448 | Shannon | July 24, 1928 |
| 1,866,289 | Boehm | July 5, 1932 |
| 2,008,437 | De Witt | July 16, 1935 |
| 2,243,663 | Wareham | May 27, 1941 |
| 2,373,417 | Rosegard | Apr. 10, 1945 |

FOREIGN PATENTS

| 15,840 | Norway | June 11, 1906 |